US012225488B2

(12) United States Patent
Fu

(10) Patent No.: US 12,225,488 B2
(45) Date of Patent: Feb. 11, 2025

(54) METHOD FOR TIME SYNCHRONIZATION DETERMINATION AND RELATED PRODUCTS

(71) Applicant: GUANGDONG OPPO MOBILE TELECOMMUNICATIONS CORP., LTD., Guangdong (CN)

(72) Inventor: Zhe Fu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 347 days.

(21) Appl. No.: 17/808,765

(22) Filed: Jun. 24, 2022

(65) Prior Publication Data

US 2022/0338143 A1    Oct. 20, 2022

Related U.S. Application Data

(63) Continuation of application No. PCT/CN2019/130952, filed on Dec. 31, 2019.

(51) Int. Cl.
*H04W 56/00* (2009.01)
*H04W 36/00* (2009.01)
*H04W 36/38* (2009.01)
*H04W 74/0833* (2024.01)

(52) U.S. Cl.
CPC ..... *H04W 56/004* (2013.01); *H04W 36/0005* (2013.01); *H04W 36/0072* (2013.01); *H04W 36/38* (2013.01); *H04W 56/001* (2013.01); *H04W 74/0833* (2013.01)

(58) Field of Classification Search
CPC ............ H04W 36/38; H04W 36/0005; H04W 36/0072; H04W 56/001; H04W 56/004; H04W 74/0833
See application file for complete search history.

(56) References Cited

U.S. PATENT DOCUMENTS

| 2018/0279186 A1* | 9/2018 | Park | H04W 36/302 |
| 2021/0235339 A1* | 7/2021 | Babaei | H04W 36/06 |
| 2022/0086780 A1* | 3/2022 | Tsai | G01S 19/05 |
| 2022/0110076 A1* | 4/2022 | Shimoda | H04W 72/0446 |
| 2022/0264490 A1* | 8/2022 | Sha | H04W 56/001 |

(Continued)

FOREIGN PATENT DOCUMENTS

| CN | 101370267 | 2/2009 |
| CN | 107872856 | 4/2018 |

(Continued)

OTHER PUBLICATIONS

EPO, Extended European Search Report for EP Application No. 19958205.7, Dec. 5, 2022.
ZTE Corporation et al., "Signalling aspects for accurate reference timing delivery in TSC," GPP TSG-RAN WG2 #107bis, R2-1912897 (Revision of R2-1908859), Oct. 2019.

(Continued)

*Primary Examiner* — Melanie Jagannathan
(74) *Attorney, Agent, or Firm* — Hodgson Russ LLP

(57) ABSTRACT

A method for time synchronization determination and related products are provided. The method includes the following. A terminal device receives a handover command from a first device, where the first device is a device currently accessed by the terminal device, and the handover command indicates that the terminal device hands over from the first device to a second device. The terminal device obtains and determines time synchronization information of the second device.

18 Claims, 6 Drawing Sheets

(56) References Cited

U.S. PATENT DOCUMENTS

| | | | | |
|---|---|---|---|---|
| 2022/0338073 A1* | 10/2022 | Awada | ................. | H04B 7/0626 |
| 2023/0189122 A1* | 6/2023 | Akl | ................... | H04W 52/0219 |
| | | | | 370/230 |
| 2023/0291468 A1* | 9/2023 | Duan | ................ | H04W 56/0045 |
| 2023/0388871 A1* | 11/2023 | Guo | ................. | H04W 36/0069 |

FOREIGN PATENT DOCUMENTS

| | | | |
|---|---|---|---|
| CN | 105530697 | | 2/2019 |
| EP | 2124489 | A1 | 11/2009 |
| WO | 2018012904 | | 1/2018 |

OTHER PUBLICATIONS

Samsung, "Accurate Timing Delivery for TSC," 3GPP TSG-RAN WG2 Meeting #106, R2-1906791 (revision of R2-1912311), May 2019.

Vivo, "Propagation delay compensation for reference time," 3GPP TSG-RAN WG2 Meeting #108, R2-1914959 (revision of R2-1912311), Nov. 2019.

Ericsson, "On Downlink Delay Compensation," 3GPP TSG-RAN WG2 #107bis, Tdoc R2-1912549, Oct. 2019.

Qualcomm Incorporated, "Control of delivery of 5G system time reference information," 3GPP TSG-SA WG2 Meeting #136, S2-1911361 (revision of S2-19xxxxx), Nov. 2019.

WIPO, International Search Report for International Application No. PCT/CN2019/130952, Oct. 10, 2020.

* cited by examiner

METHOD FOR TIME SYNCHRONIZATION DETERMINATION AND RELATED PRODUCTS

CROSS REFERENCE TO RELATED APPLICATION(S)

This application is a continuation of International Application No. PCT/CN2019/130952, filed on Dec. 31, 2019, the entire disclosure of which is incorporated herein by reference.

TECHNICAL FIELD

The present disclosure relates to the field of communication technology, and more particularly, to a method for time synchronization determination and related products.

BACKGROUND

In 5th generation (5G) mobile networks, an industrial internet of things (IIoT) needs to support transmission of factory automation, transport industry, electrical power distribution, and other traffic in a 5G system. Based on transmission requirements of the IIoT on delay and reliability, a concept of time sensitive network (TSN) is introduced. In the TSN, a 5G network may act as a TSN bridge to provide services for the TSN and TSN traffic. Therefore, a 5G new radio (NR) system needs to provide a lower delay and higher clock synchronization accuracy, so that when factory automation traffic is transmitted in the 5G network, machinery can operate accurately at every point and meet a time requirement. At present, when a terminal device of a user is moving and involved in cell handover, how to achieve time synchronization with a cell to be accessed and ensure that the 5G network still meets time synchronization and synchronization accuracy required by the TSN is an open question.

SUMMARY

In a first aspect, a method for time synchronization determination is provided in implementations of the present disclosure. The method includes the following. A terminal device receives a handover command from a first device, where the first device is a device currently accessed by the terminal device, and the handover command indicates that the terminal device hands over from the first device to a second device. The terminal device obtains and determines time synchronization information of the second device.

In a second aspect, a method for time synchronization determination is provided in implementations of the present disclosure. The method includes the following. A first device transmits a handover command to a terminal device, where the handover command indicates that the terminal device hands over from the first device currently accessed to a second device, and the handover command is used to be received by the terminal device to obtain and determine time synchronization information of the second device.

In a third aspect, a method for time synchronization determination is provided in implementations of the present disclosure. The method includes the following. A second device receives a handover request message transmitted from a first device. The second device transmits an acknowledgment (ACK) message for the handover request message to the first device, where the ACK message is used for the first device to transmit a handover command to a terminal device according to the ACK message, the first device is a device currently accessed by the terminal device, the handover command indicates that the terminal device hands over from the first device to the second device, and the handover command is used to be received by the terminal device to obtain and determine time synchronization information of the second device.

In a fourth aspect, a terminal device is provided in implementations of the present disclosure. The terminal device includes a processor, a memory configured to store one or more programs, and a communication interface. The one or more programs are configured to be executed by the processor and include instructions configured to perform the operations in any method in the first aspect of implementations of the present disclosure.

In a fifth aspect, a first device is provided in implementations of the present disclosure. The first device includes a processor, a memory configured to store one or more programs, and a communication interface. The one or more programs are configured to be executed by the processor and include instructions configured to perform the operations in any method in the second aspect of implementations of the present disclosure.

In a sixth aspect, a second device is provided in implementations of the present disclosure. The second device includes a processor, a memory configured to store one or more programs, and a communication interface. The one or more programs are configured to be executed by the processor and include instructions configured to perform the operations in any method in the third aspect of implementations of the present disclosure.

BRIEF DESCRIPTION OF THE DRAWINGS

The accompanying drawings required for description of implementations or the related art will be briefly introduced below.

DETAILED DESCRIPTION

The following will describe technical solutions of implementations of the present disclosure with reference to the accompanying drawings. Apparently, implementations described herein are merely some implementations, rather than all implementations, of the present disclosure. Based on the implementations of the present disclosure, all other implementations obtained by those of ordinary skill in the art without creative effort shall fall within the protection scope of the present disclosure.

The technical solutions of implementations of the present disclosure are applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, a wireless local area networks (WLAN), a wireless fidelity (WiFi), a next-generation communication system, or other communication systems.

Generally speaking, a conventional communication system generally supports a limited number of connections and therefore is easy to implement. However, with development of communication technology, a mobile communication system will not only support conventional communication but also support, for example, device to device (D2D) communication, machine to machine (M2M) communication, machine type communication (MTC), and vehicle to vehicle (V2V) communication. Implementations of the present disclosure are also applicable to these communication systems.

Figure 1A:
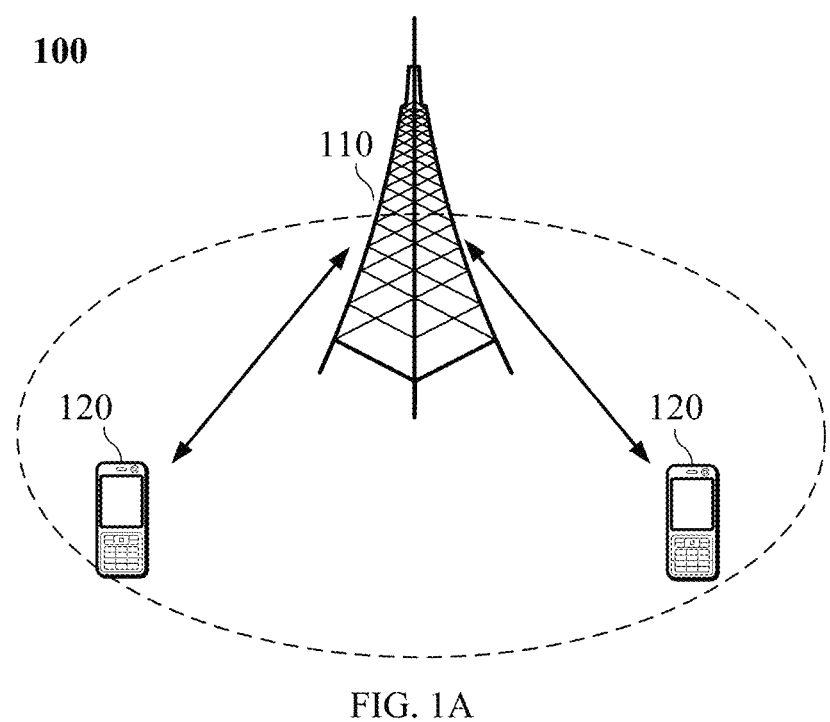
FIG. 1A is a network architecture diagram of a communication system provided in implementations of the present disclosure.

Exemplarily, as illustrated in FIG. 1A, a communication system 100 may include a network device 110. The network device 110 may be a device that can communicate with a terminal device 120 (or referred to as a communication terminal or a terminal). The network device 110 can provide a communication coverage for a specific geographical area and communicate with terminal devices in the coverage area. Optionally, the network device 110 may be a base transceiver station (BTS) in the GSM or in the CDMA system, or may be a NodeB (NB) in the WCDMA system, or may be an evolutional Node B (eNB or eNodeB) in the LTE system, or may be a radio controller in a cloud radio access network (CRAN). Alternatively, the network device may be a mobile switching center, a relay station, an access point, an in-vehicle device, a wearable device, a hub, a switch, a bridge, a router, a network-side device in a 5th generation (5G) network, or a network device in a future evolved public land mobile network (PLMN).

The communication system 100 further includes at least one terminal device 120 in a coverage area of the network device 110. The "terminal device" referred to herein can include but is not limited to a device configured to communicate via a wired line, another data connection/network, a wireless interface, a device which is part of another terminal device and configured to receive/transmit communication signals, and/or an Internet of things (IoT) device. Examples of the wired line may include, but are not limited to, a public switched telephone network (PSTN), a digital subscriber line (DSL), a digital cable, and a direct connection cable. Examples of the wireless interface may include, but are not limited to, a wireless interface for a cellular network, a wireless local area network (WLAN), a digital television network (such as a digital video broadcasting-handheld (DVB-H) network), a satellite network, and an amplitude modulation-frequency modulation (AM-FM) broadcast transmitter. A terminal device configured to communicate via a wireless interface may be called a "wireless communication terminal", a "wireless terminal", or a "mobile terminal". Examples of the mobile terminal may include, but are not limited to, a satellite or cellular telephone, a personal communication system (PCS) terminal that can combine a cellular radio telephone with data processing, fax, and data communication capabilities, a personal digital assistant (PDA) that can be a radio telephone, a pager, internet/intranet access, a web browser, a memo pad, a calendar, and/or a global positioning system (GPS) receiver, a conventional laptop and/or a palmtop receiver, or other electronic devices including a radiotelephone transceiver. The terminal device may refer to an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal device in the 5G network, a terminal device in the future evolved PLMN, etc.

Optionally, the terminal devices 120 may communicate with each other through device to device (D2D) communication.

Optionally, a 5G system or 5G network may also be referred to as a NR system or NR network.

FIG. 1A exemplarily illustrates one network device and two terminal devices. Optionally, the communication system 100 may include multiple network devices, and there may be other numbers of terminal devices in a coverage area of each of the network devices, which is not limited herein.

Optionally, the communication system 100 may further include other network entities such as a network controller, a mobility management entity, or the like, which is not limited herein.

It should be understood that, in implementations of the present application, a device having a communication function in a network/system may be referred to as a communication device. Taking the communication system 100 illustrated in FIG. 1A as an example, the communication device may include the network device 110 and the terminal device 120 having a communication function, and the network device 110 and the terminal device 120 may be the specific devices described above, which will not be repeated herein. The communication device may also include other devices in the communication system 100, such as a network controller, a mobility management entity, and other network entities, which is not limited herein.

It should be understood that, the terms "system" and "network" herein are usually interchangeable. The term "and/or" herein describes only an association relationship for describing associated objects and represents that three relationships may exist. For example, A and/or B may represent the following three cases: only A exists, both A and B exist, and only B exists. In addition, the character "/" herein generally indicates an "or" relationship between the associated objects.

Figure 1B:
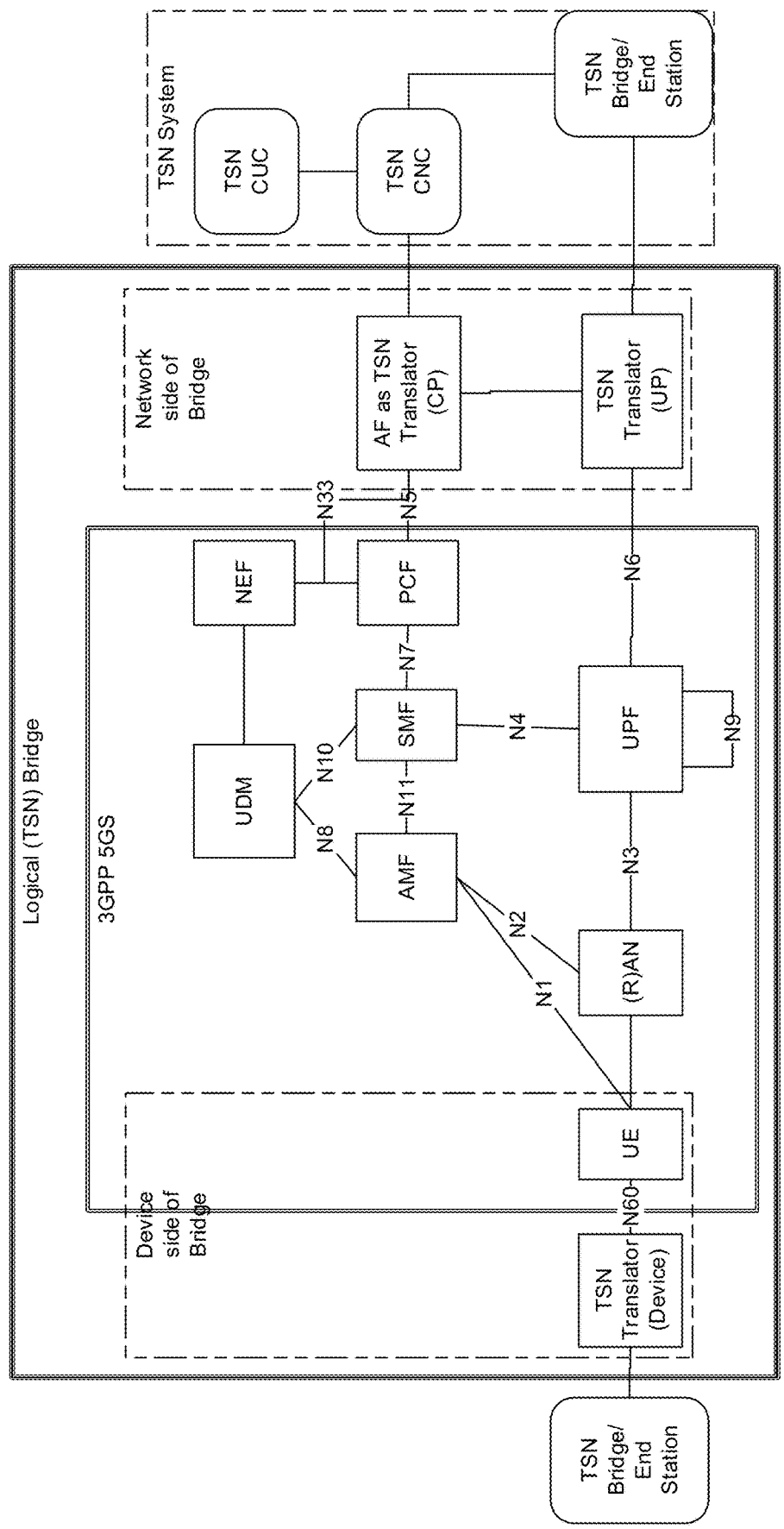
FIG. 1B is a network architecture diagram of a communication system of a time sensitive network (TSN) provided in implementations of the present disclosure.

Methods in implementations of the present application are applicable to an industrial internet of things (IIoT) in 5G mobile networks. The IIoT needs to support transmission of factory automation, transport industry, electrical power distribution, and other traffic in a 5G system. Based on transmission requirements of the IIoT on delay and reliability, a concept of time sensitive network (TSN) is introduced. In the TSN network, as illustrated in FIG. 1B, a 5G network may act as a TSN bridge to provide services for the TSN and TSN traffic. Therefore, a 5G NR system needs to provide a lower delay and higher clock synchronization accuracy, so that when factory automation traffic is transmitted in the 5G network, machinery can operate accurately at every point and meet a time requirement.

Figure 1C:
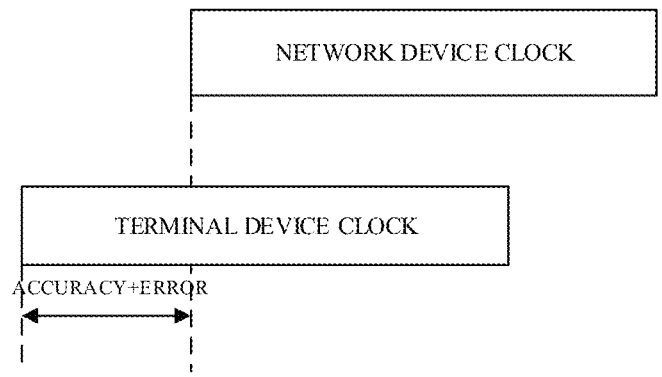
FIG. 1C is a schematic diagram of a time accuracy difference between a terminal device and a network device provided in implementations of the present disclosure.

Based on requirements of transmission of TSN traffic, when the TSN traffic is transmitted in 5G, requirements on time synchronization need to be met. The requirements on time synchronization include a time synchronization accuracy requirement of 1 us. As illustrated in FIG. 1C, from a perspective of air interface, whether time accuracy of 1 us can be reached is related to accuracy of synchronization time information notified by the network device and a time synchronization accuracy error Delta at the terminal device side. The synchronization error at the terminal device side is determined by a physical layer of a radio access network (RAN) and is related to many factors, such as propagation loss, device limitations, etc.

In Release 16 (Rel-16), existing synchronization accuracy between a network device and a terminal device, i.e., accuracy of time information notified by the network device, is enhanced to ensure that the TSN traffic meets the time synchronization accuracy requirement of 1 us. Specifically, in NR, the time accuracy is refined from 10 ms to 10 ns. In some scenarios, propagation delay compensation is required to make the time synchronization accuracy error of the physical layer within a required range, thereby finally ensure that the TSN traffic meets the time synchronization accuracy requirement of 1 us when transmitting in 5G.

A terminal device involved in methods in implementations of the present application may be a device supporting time sensitive communication (TSC), a device supporting at least Rel-16/Release 17 (Rel-17) time synchronization, a device supporting high/specific time synchronization accuracy, such as accuracy of 0.25 us or 10 ns, or a terminal device with propagation delay compensation capability.

A first device and a second device involved in methods in implementations of the present application may be the terminal devices or network devices mentioned above. When the first device and the second device are the network devices, they are TSC-enabled network devices, network devices supporting at least Rel-16/Rel-17 time synchronization, network devices supporting high/specific time synchronization accuracy, such as accuracy of 0.25 us or 10 ns, network devices with propagation delay compensation capability, or network devices without propagation delay compensation capability.

Figure 2:
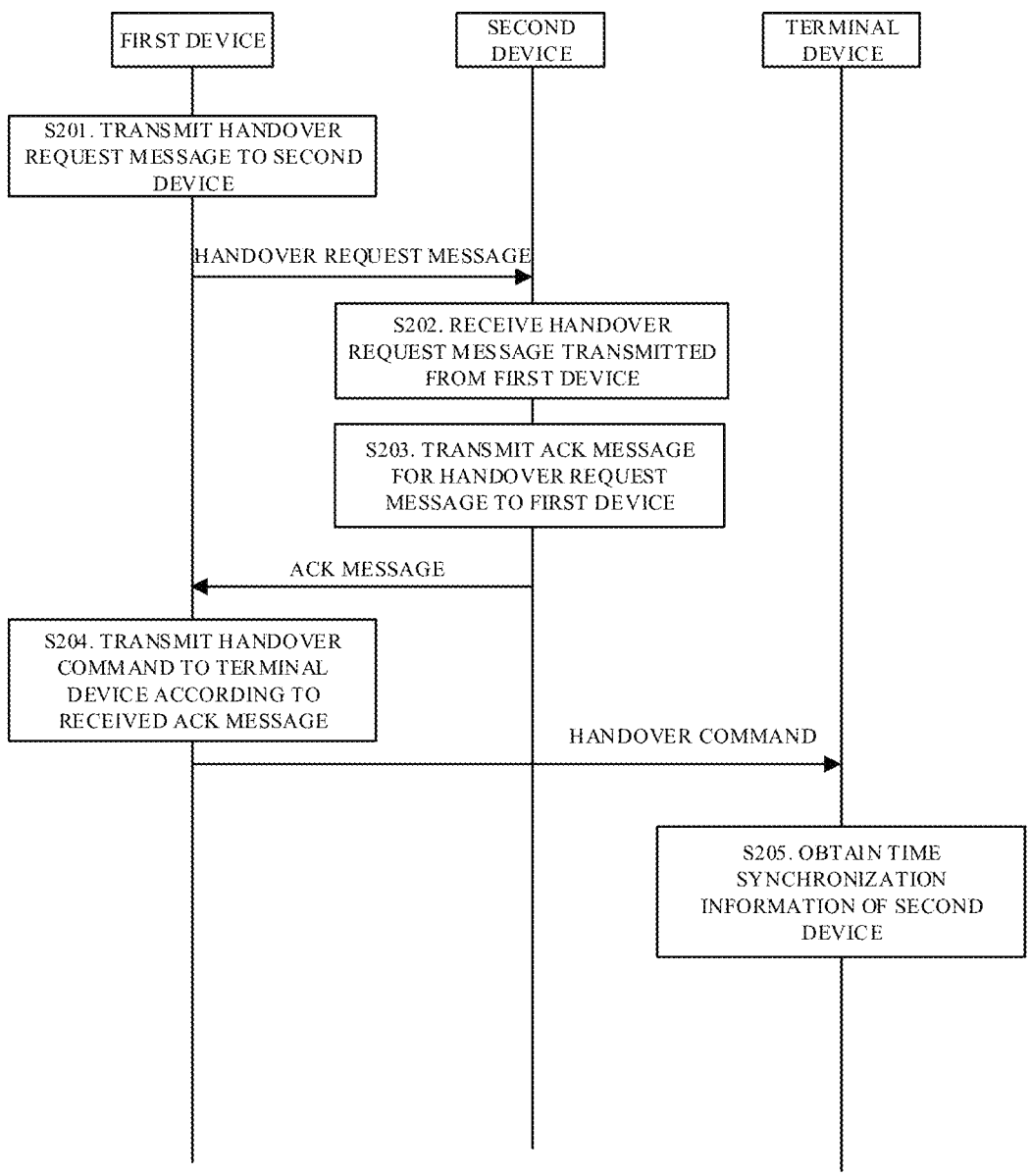
FIG. 2 is a schematic flowchart of a method for time synchronization determination provided in implementations of the present disclosure.

Referring to FIG. 2, FIG. 2 illustrates a method for time synchronization determination provided in implementations of the present disclosure. The method is applicable to the communication system mentioned above and includes some or all of the following operations.

At S201, a first device transmits a handover request message to a second device.

The first device is a device currently accessed by a terminal device, and the second device is a target device to be accessed by the terminal device. The first device and the second device may be network devices or terminal devices.

The handover request may be a handover request transmitted by the first device to the second device when the terminal device gradually moves away from the coverage of the first device and needs to access the second device.

At S202, the second device receives the handover request message transmitted from the first device.

The second device makes a handover decision, for example, according to channel state information, time synchronization information, and the like when receiving the handover request message transmitted by the first device, and feeds back a message when determining that the terminal device can access.

At S203, the second device transmits an acknowledgement (ACK) message for the handover request message to the first device.

The time synchronization information of the second device may be carried in the ACK message and is to be transmitted by the first device to the terminal device for the terminal device to perform time synchronization with the second device.

Optionally, if the second device is a terminal device rather than a network device, that is, a master node (MN) is a terminal device, the time synchronization information can be notified to the first device or the terminal device by the second device, or by the second device through a network device.

At S204, the first device transmits a handover command to the terminal device after receiving the ACK message.

The time synchronization information of the second device may be contained in the handover command. Further, identification information of the second device may also be contained in the handover command.

At S205, the terminal device obtains and determines time synchronization information of the second device.

In a possible example, the first device includes one of a source base station and a first terminal device, and the second device includes one of a target base station and a second terminal device.

The terminal device may obtain the time synchronization information of the second device in various ways. For example, the terminal device may obtain the time synchronization information through the first device when receiving the handover command, obtain the time synchronization information by reading system information of the second device after receiving the handover command, obtain the time synchronization information from the second device by communicating with the second device after handover success, etc., or obtain the time synchronization information through a combination of at least two of the above ways, which is not limited herein.

The terminal device may determine the time synchronization information of the second device as follows. The terminal device determines what information is contained in the time synchronization information obtained, determines whether information in the time synchronization information is complete, or determines whether propagation delay compensation indication information is contained in the time synchronization information, etc., which is not limited herein.

It can be seen that, in implementations of the present disclosure, the terminal device receives the handover command from the first device, where the first device is the device currently accessed by the terminal device, and the handover command indicates that the terminal device hands over from the first device to the second device, and obtains and determines the time synchronization information of the second device. It can be seen that, when receiving, during moving, the handover command to access the second device, the terminal device obtains the time synchronization information of the second device in time, so as to ensure that after the terminal device accesses the second device, the time synchronization with the second device is met, thereby ensuring accuracy of data transmission.

In a possible example, the time synchronization information includes at least one of: synchronization time of the second device, time synchronization accuracy of the second device, and propagation delay compensation information.

In a possible example, the synchronization time of the second device includes one or more of: a reference system frame number (SFN), uncertainty, time corresponding to the SFN, a TSC clock domain.

In a possible example, the propagation delay compensation information is used for the terminal device to determine a propagation delay compensation state between the terminal device and the second device.

Determination of the propagation delay compensation state may refer to the following. Whether the second device has performed propagation delay compensation and whether the terminal device performs propagation delay compensation are determined according to the propagation delay compensation indication information in the propagation delay compensation information, or the propagation delay compensation condition for propagation delay compensation and a valid duration of the propagation delay compensation are determined according to the propagation delay compensation condition in the propagation delay compensation information.

The propagation delay compensation indication information includes one or more of: an indication of whether the terminal device performs propagation delay compensation, and an indication whether the second device has performed propagation delay compensation. The propagation delay compensation information may also include one or more of: a compensation value or a compensation value list for propagation delay compensation by the terminal device, a condition for propagation delay compensation by the terminal device, and valid time and invalid time of the time synchronization information, that is, the valid duration of the propagation delay compensation mentioned above.

The time corresponding to the SFN includes: day, hour, minute, second, millisecond, microsecond, and nanosecond. The terminal device may determine clock information of the second device, such as which timing (hour/minute/second) corresponds to which SFN, according to the synchronization time of the second device, thereby performing time synchronization with the second device.

According to the time synchronization accuracy, such as an indication of high/low accuracy or an accuracy value, the terminal device may know the time synchronization accuracy of the second device, determine whether the second device meets a time synchronization accuracy requirement, and whether to perform propagation delay compensation, etc. For example, when the time synchronization accuracy in the time synchronization information meets the requirement, for example, when the time synchronization accuracy is greater than a preset threshold and is high accuracy, the terminal device performs time synchronization with the second device according to the information. The time synchronization with the second device may include updating time of the terminal device and performing propagation delay compensation.

According to the indication of whether the terminal device performs propagation delay compensation, the terminal device may determine whether to perform propagation delay compensation to ensure synchronization and/or synchronization accuracy with the second device.

According to the indication of whether the second device has performed propagation delay compensation, the terminal device may determine whether the second device has performed propagation delay compensation and/or whether the terminal device needs to perform propagation delay compensation. For example, when the time synchronization information indicates that the second device has performed propagation delay compensation, the terminal device does not perform propagation delay compensation according to the message. For another example, when the time synchronization information indicates that the second device has performed propagation delay compensation and a condition for propagation delay compensation is met, the terminal device performs propagation delay compensation according to the indication message.

According to the compensation value/the compensation value list for propagation delay compensation by the terminal device, the terminal device may determine a value to be compensated when performing propagation delay compensation.

According to the condition for propagation delay compensation by the terminal device, such as a distance from the second device, a channel quality difference, a path loss difference, a delay difference with the second device, a threshold, a threshold list, etc., the terminal device may determine a basis for determining whether to make propagation delay compensation and a condition for performing propagation delay compensation. For example, when the distance from the second device is less than 200 m, propagation delay compensation is performed. Alternatively, the condition for propagation delay compensation may also include a time indication, such as a time indication of when the terminal device starts to perform propagation delay compensation.

It can be seen that, in this example, the time synchronization information includes various information, according to which the terminal device may perform time synchronization more accurately and purposefully.

In a possible example, the method further includes the following. After obtaining and determining the time synchronization information of the second device, the terminal device performs time synchronization with the second device according to the time synchronization information.

The terminal device may perform the time synchronization with the second device according to the time synchronization information in various ways. For example, when the synchronization time of the second device is contained in the time synchronization information and the second device has no information to perform propagation delay compensation, the terminal device first updates the time of the terminal device according to the synchronization time of the second device, and then performs propagation delay compensation because the second device has not performed propagation delay compensation. The compensation value for propagation delay compensation may be a timing advance (TA) related value, such as 0.5 TA or 0.5 NTA, or a default value. Alternatively, when the time synchronization information contains the synchronization time of the second device, an indication of the terminal device to perform propagation delay compensation, the compensation value for propagation delay compensation by the terminal device, and the condition for propagation delay compensation by the terminal device, the terminal device first updates the time of the terminal device according to the synchronization time of the second device, and then performs propagation delay compensation according to the indication information when the condition for propagation delay compensation is met. Further, if the compensation value is contained, compensation is performed according to the compensation value, which is not limited herein.

It can be seen that, in this example, the terminal device performs the time synchronization with the second device according to the time synchronization information obtained, so as to ensure that the time synchronization accuracy with the second device is improved after the terminal device accesses the second device.

In a possible example, the propagation delay compensation information includes a compensation value and/or a compensation value list for propagation delay compensation by the terminal device, and the compensation value and/or the compensation value list for propagation delay compensation by the terminal device is used for the terminal device to perform propagation delay compensation according to the compensation value or the compensation value list.

Correspondingly, for example, the compensation value or a first value in the compensation value list is used when a first condition is met, the compensation value or a second value in the compensation value list is used when a second condition is met, and so on.

It can be seen that, in this example, the terminal device may perform propagation delay compensation according to the compensation value or the compensation value list, where the compensation value list contains different compensation values for different situations, which is beneficial to improving accuracy of propagation delay compensation.

In a possible example, the propagation delay compensation information does not include a compensation value and/or a compensation value list for propagation delay compensation by the terminal device, and the method further includes the following. The terminal device performs propagation delay compensation according to a preconfigured TA or a preset compensation value. The preset compensation value may be preset in the terminal device by the technician according to an experience value before the electronic device leaves the factory, which is not limited herein.

It can be seen that, in this example, the terminal device performs propagation delay compensation according to the preset compensation value, thereby reducing data amount in the time synchronization information and improving a speed of obtaining the time synchronization information.

In a possible example, the terminal device obtains and determines the time synchronization information of the second device as follows. The terminal device obtains and determines the time synchronization information of the second device through a dedicated radio resource control (RRC) message transmitted by the first device.

The terminal device may obtain the time synchronization information of the second device through the dedicated RRC message transmitted by the first device before receiving the handover command, when receiving the handover command, or after receiving the handover command. The terminal device may directly perform time synchronization with the second device according to the time synchronization information. Of course, if the time information is only part of information, the terminal device can only perform the time synchronization with the second device after obtaining all the time information, for example, by obtaining the time synchronization information of the second device.

In a possible example, the terminal device obtains and determines the time synchronization information of the second device through the dedicated RRC message transmitted by the first device as follows. The terminal device obtains the time synchronization information of the second device carried in the handover command from the first device, and determines the time synchronization information.

The dedicated RRC message may be various, for example, may be the handover command. That is, the time synchronization information may be carried in the handover command transmitted by the first device to the terminal device.

In a possible example, the time synchronization information is time synchronization information carried in an ACK message transmitted by the second device to the first device, and the ACK message is a feedback message of the second device for a handover request message of the first device.

In a possible example, the terminal device obtains and determines the time synchronization information of the second device as follows. The terminal device reads and determines system information of the second device in a process of performing handover according to the handover command, where the time synchronization information is contained in the system information.

Optionally, the time synchronization information may also be notified to the first device through other information from the second device. Of course, the first device may also be notified before the process of performing handover process, which is not limited herein.

In a possible example, the time synchronization information is time synchronization information of the second device obtained by the first device through other network devices. The other network devices may be a session management function (SMF), an access and mobility management function (AMF), a center network control (CNC), an operation administration and maintenance (OAM), etc.

It can be seen that, in this example, the terminal device may obtain the time synchronization information from the dedicated RRC message, or directly obtain the time synchronization information from the handover command, which is beneficial to reducing signaling consumption and improving convenience of obtaining the time synchronization information.

In a possible example, the terminal device reads and determines the system information of the second device in the process of performing handover according to the handover command as follows. The terminal device reads and determines the system information of the second device at a first moment, where the first moment includes any one of: when the handover command is received, in the process of performing handover according to the handover command, when part of the time synchronization information is obtained, before an random access procedure for the second device, during the random access procedure for the second device, when the random access procedure succeeds, when the handover is completed, when an RRC reconfiguration complete message is transmitted to the second device, and when an indication to read the system information of the second device is received.

When part of the time synchronization information is obtained, for example, when the terminal device obtains part of the time synchronization information from the handover command or the dedicated RRC message (for example, the part of the time synchronization information does not indicate whether the terminal device performs propagation delay compensation), the terminal device may continue to obtain the time synchronization information by reading the system information of the second device at the first moment. That is, parts of the time synchronization information are respectively obtained from the handover command and the system information of the second device.

When the time synchronization information is obtained by obtaining part of the synchronization information from the handover command and obtaining another part of the synchronization information by reading the system information of the second device, the terminal device may perform time synchronization with the second device (including updating the time of the terminal device and performing or not performing propagation delay compensation) after obtaining both parts of the information, or first update the time of the terminal device after obtaining part of the synchronization information, and perform or not perform propagation delay compensation after obtaining another part of the synchronization information, such as indication information that the mobile terminal performs propagation delay compensation.

When an indication to read the system information of the second device is received, that is, when the terminal device receives the indication transmitted by the first device to read the system information of the second device, the indication may be carried in the dedicated RRC, for example, in the handover command. The dedicated RRC, for example, the handover command indicates that the terminal device reads the system information of the second device. In addition, the indication information may also be carried in system information, such as system information of the first device.

It can be seen that, in this example, the terminal device may determine the second device to access in the handover process, such as at the first moment, and then read the system information of the second device to obtain the time synchronization information, which improves convenience and timeliness of information obtaining, thereby improving timeliness of time synchronization between the terminal device and the second device.

In a possible example, the terminal device performs the time synchronization with the second device according to the time synchronization information as follows. The terminal device updates the time of the terminal device according to the time synchronization information and/or performs propagation delay compensation according to the time synchronization information.

Optionally, the terminal device may also skip propagation delay compensation according to the time synchronization information. For example, the terminal device may skip propagation delay compensation according to an indication that the terminal device does not perform propagation delay compensation in the time synchronization information, skip propagation delay compensation according to a message in the time synchronization information indicates that the second device has performed propagation delay compensation, skip propagation delay compensation because the time synchronization information does not indicates that the terminal device performs propagation delay compensation, or skip propagation delay compensation under a certain condition because the time synchronization information does not indicates that the terminal device performs propagation delay compensation, which is not limited herein.

Propagation delay compensation may be performed according to the time synchronization information as follows. For example, the terminal device may perform propagation delay compensation according to an indication that the terminal device performs propagation delay compensation in the time synchronization information, perform propagation delay compensation when time synchronization accuracy in the time synchronization information is high accuracy, perform propagation delay compensation operation when the time synchronization information indicates that the second device has not performed propagation delay compensation, perform propagation delay compensation when the time synchronization information does not indicates that the terminal device skips propagation delay compensation, perform propagation delay compensation under a certain condition when the time synchronization information does not indicates that the terminal device performs propagation delay compensation, or perform propagation delay compensation under a certain condition when the time synchronization information does not indicates that the terminal device skips propagation delay compensation, which is not limited herein.

The certain condition may be predefined or configured, or may be determined based on implementations of the mobile terminal. A determination basis may be at least one of the following factors: a path loss, channel quality, time, mobile terminal capability, base station capability, a version, etc. The certain condition may be determined based on implementations of the mobile terminal as follows. The certain condition may be determined by the terminal device according to a current execution strategy, execution algorithm, or state information.

It can be seen that, in this example, when performing time synchronization with the second device, the terminal device not only updates the time, but also performs propagation delay compensation on the basis of the time updating and synchronization with the second device, which further improves time synchronization accuracy, thereby improve timeliness of data transmission after the terminal device accesses the second device.

In a possible example, the terminal device updates the time of the terminal device according to the time synchronization information and/or performs propagation delay compensation according to the time synchronization information as follows. The terminal device updates the time of the terminal device according to a first type of information in the time synchronization information and/or performs propagation delay compensation according to a second type of information in the time synchronization information.

The first type of information is information required for updating the time of the terminal device, and the second type of information is information required for performing propagation delay compensation.

The first type of information at least contains synchronization time, and the second type of information may be various. For example, the second type of information at least contains indication information of whether the terminal device performs propagation delay compensation, or at least contains information of whether the second device has performed propagation delay compensation, etc. The terminal device may determine whether to perform propagation delay compensation according to the indication information of whether the terminal device performs propagation delay compensation or according to information of whether the second device has performed propagation delay compensation. For example, if the second device has not performed propagation delay compensation, the terminal device needs to perform propagation delay compensation, etc.

Optionally, the terminal device may also skip propagation delay compensation according to the second type of information.

It can be seen that, in this example, when performing time synchronization with the second device, the terminal device classifies the time synchronization information into two types of information, updates the time according to the first type of information, and performs propagation delay compensation according to the second type of information, which is beneficial to improving convenience of time synchronization and clarity of information.

In a possible example, the terminal device performs the time synchronization with the second device according to the time synchronization information as follows. The terminal device hands over to the second device according to the handover command. The terminal device obtains related information of the time synchronization of the second device. The terminal device updates the time of the terminal device according to the time synchronization information and the related information of the time synchronization and/or performs or does not perform propagation delay compensation.

The time synchronization information includes part of synchronization information, and the obtaining of part of the synchronization information may be achieved in three ways. The first way is to obtain part of the synchronization information from the handover command. The second way is to obtain part of the synchronization information by reading the system information of the second device. The third way is to obtain part of the synchronization information from the handover command and obtain part of the synchronization information by reading the system information of the second device. The time synchronization information obtained in the above three ways still only includes part of the synchronization information. That is, all the information in the time synchronization information is not enough for the terminal device to perform time updating and/or propagation delay compensation. For example, the time synchronization information does not include synchronization time, or does not include indication information of whether the terminal device performs propagation delay compensation. Therefore, the terminal device needs to continue to obtain the related information of the time synchronization, that is, to obtain the related information after completely accessing the second device. The related information may or may not include the existing part of the synchronization information in the time synchronization information, which is not limited herein.

The terminal device may obtain the related information of the time synchronization of the second device in various ways. For example, the terminal device may obtain the related information of the time synchronization by reading the system information of the second device after handing over to the second device, or may request the related information of the time synchronization of the second device by communicating with the second device, and receive the related information transmitted by the second device, etc., which is not limited herein.

It can be seen that, in this example, when the time synchronization information is incomplete, the terminal device first hands over to the second device, completes the time synchronization information, and then performs time updating and propagation delay compensation, which is beneficial to improving time synchronization accuracy.

In a possible example, the time synchronization information does not include indication information of whether the terminal device performs propagation delay compensation, and the terminal device performs the time synchronization with the second device according to the time synchronization information as follows. The terminal device updates the time of the terminal device according to the time synchronization information. The terminal device obtains the indication information of whether the terminal device performs propagation delay compensation after handing over to the second device according to the handover command. The terminal device performs or skips propagation delay compensation according to the indication information.

The terminal device may obtain the indication information of whether the terminal device performs propagation delay compensation in various ways. For example, the terminal device may obtain the indication information of whether the terminal device performs propagation delay compensation by reading the system information of the second device after handing over to the second device, or may communicate with the second device, transmit an inquiry message to the second device, and receive the indication information of whether the terminal device performs propagation delay compensation transmitted by the second device, which is not limited herein.

The obtaining of time synchronization information other than the indication information of whether the terminal device performs propagation delay compensation may be achieved in three ways. The first way is to obtain the time synchronization information from the handover command. The second way is to obtain the time synchronization information by reading the system information of the second device. The third way is to obtain part of the time synchronization information from the handover command and obtain part of the time synchronization information by reading the system information of the second device. The time synchronization information obtained in the above three ways does not include the indication information of whether the terminal device performs propagation delay compensation, and after completely handing over to the second device, the terminal device obtains the indication information of whether the terminal device performs propagation delay compensation, and performs or skips propagation delay compensation according to the indication information.

It can be seen that, in this example, instead of performing time updating and propagation delay compensation after all the information is obtained, the terminal device first performs time updating according to information in the time synchronization information before obtaining the indication information of whether the terminal device performs propagation delay compensation, obtains the indication information of whether the terminal device performs propagation delay compensation after accessing the second device, and then performs or skips propagation delay compensation according to the indication information, which is beneficial to improving timeliness of time synchronization.

In above possible examples, the method further includes the following. Before obtaining the indication message of whether the terminal device performs propagation delay compensation, the terminal device performs or does not performs propagation delay compensation, or whether the terminal device performs propagation delay compensation depends on user implementations. For example, the terminal device determines whether to perform propagation delay compensation according to a current execution strategy, execution algorithm, or state information.

The state information of the terminal device may be, for example, a current processing speed of a central processing unit (CPU) of the terminal device, signal quality of the terminal device, etc., which is not limited herein.

It can be seen that, in this example, before obtaining the indication message of whether the terminal device performs propagation delay compensation, the terminal device may perform or not perform propagation delay compensation, or determine whether to perform propagation delay compensation according to the execution strategy, the execution algorithm, or the state information of the terminal device, which is beneficial to improving flexibility of propagation delay compensation.

It should be noted that the method is applicable to behaviors and operations of the mobile terminal at the source base station, and is also applicable to behaviors and operations of the terminal at the target base station.

Figure 3:
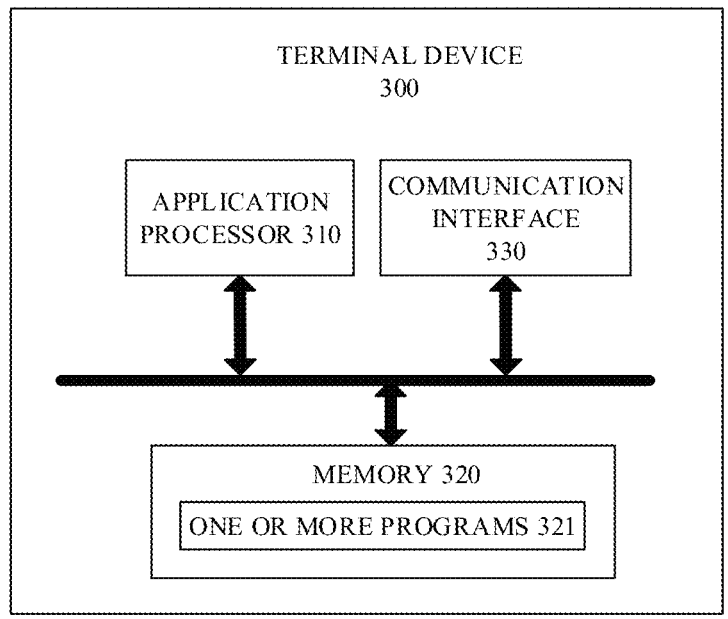
FIG. 3 is a schematic structural diagram of a terminal device provided in implementations of the present disclosure.

Consistent with above implementations illustrated in FIG. 2, referring to FIG. 3, FIG. 3 is a schematic structural diagram of a terminal device 300 provided in implementations of the present application. As illustrated in FIG. 3, the terminal device 300 includes a processor 310, a memory 320 configured to store one or more programs 321, and a communication interface 330. The one or more programs 321 are configured to be executed by the processor 310 and include instructions configured to perform the following.

A handover command is received from a first device, where the first device is a device currently accessed by the terminal device, and the handover command indicates that the terminal device hands over from the first device to a second device. Time synchronization information of the second device is obtained and determined.

It can be seen that, in implementations of the present application, the terminal device receives the handover command from the first device, where the first device is the device currently accessed by the terminal device, and the handover command indicates that the terminal device hands over from the first device to the second device, and obtains and determines the time synchronization information of the second device. It can be seen that, when receiving, during moving, the handover command to access the second device, the terminal device obtains the time synchronization information of the second device in time, so as to ensure that after the terminal device accesses the second device, the time synchronization with the second device is met, thereby ensuring accuracy of data transmission.

In a possible example, the time synchronization information includes at least one of: synchronization time of the second device, time synchronization accuracy of the second device, and propagation delay compensation information.

In a possible example, the instructions in the one or more programs 321 are further configured to perform the following. After the time synchronization information of the second device is obtained and determined, time synchronization with the second device is performed according to the time synchronization information.

In a possible example, the time synchronization information includes synchronization time of the second device, and the instructions in the one or more programs 321 are further configured to perform the following. Clock information of the second device is determined according to the synchronization time of the second device, where the clock information of the second device is used for time synchronization with the second device.

In a possible example, the synchronization time of the second device includes: a SFN, uncertainty, time corresponding to the SFN, and a TSC clock domain.

In a possible example, the time synchronization information includes time synchronization accuracy of the second device, and in terms of performing the time synchronization with the second device according to the time synchronization information, the instructions in the one or more programs 321 are specifically configured to perform the following. Whether the time synchronization accuracy of the second device meets a preset threshold is determined. The time synchronization with the second device is performed based on a determination that the time synchronization accuracy of the second device meets the preset threshold.

In a possible example, the time synchronization information includes propagation delay compensation information, and the instructions in the one or more programs 321 are further configured to perform the following. A propagation delay compensation state with the second device is determined according to the propagation delay compensation information.

In a possible example, the propagation delay compensation information includes propagation delay compensation indication information, and in terms of determining the propagation delay compensation state with the second device according to the propagation delay compensation information, the instructions in the one or more programs 321 are specifically configured to perform the following. Whether the second device has performed propagation delay compensation and whether the terminal device performs propagation delay compensation are determined according to the propagation delay compensation indication information.

In a possible example, the propagation delay compensation information includes a propagation delay compensation condition, and in terms of determining the propagation delay compensation state with the second device according to the propagation delay compensation information, the instructions in the one or more programs 321 are specifically configured to perform the following. The propagation delay compensation condition for propagation delay compensation and a valid duration of the propagation delay compensation are determined according to the propagation delay compensation condition.

In a possible example, the propagation delay compensation information includes a compensation value and/or a compensation value list for propagation delay compensation by the terminal device, and the compensation value and/or the compensation value list for propagation delay compensation by the terminal device is used for the terminal device to perform propagation delay compensation according to the compensation value or the compensation value list.

In a possible example, the propagation delay compensation information does not include a compensation value and/or a compensation value list for propagation delay compensation by the terminal device, and the instructions in the one or more programs 321 are further configured to perform the following. Propagation delay compensation is performed according to a preconfigured TA or a preset compensation value.

In a possible example, in terms of obtaining and determining the time synchronization information of the second device, the instructions in the one or more programs 321 are specifically configured to perform the following. The time synchronization information of the second device is obtained and determined through a dedicated RRC message transmitted by the first device.

In a possible example, in terms of obtaining and determining the time synchronization information of the second device through the dedicated RRC message transmitted by the first device, the instructions in the one or more programs 321 are specifically configured to perform the following. The time synchronization information of the second device carried in the handover command from the first device is obtained and the time synchronization information is determined.

In a possible example, the time synchronization information is time synchronization information carried in an ACK message transmitted by the second device to the first device, and the ACK message is a feedback message of the second device for a handover request message of the first device.

In a possible example, in terms of obtaining and determining the time synchronization information of the second device, the instructions in the one or more programs 321 are specifically configured to perform the following. System information of the second device is read and determined in a process of performing handover according to the handover command, where the time synchronization information is contained in the system information.

In a possible example, in terms of reading and determining the system information of the second device in the process of performing handover according to the handover command, the instructions in the one or more programs 321 are specifically configured to perform the following. The system information of the second device is read and determined at a first moment. The first moment includes any one of: when the handover command is received, in the process of performing handover according to the handover command, when part of the time synchronization information is obtained, before an random access procedure for the second device, during the random access procedure for the second device, when the random access procedure succeeds, when the handover is completed, when an RRC reconfiguration complete message is transmitted to the second device, and when an indication to read the system information of the second device is received.

In a possible example, the first device includes one of a source base station and a first terminal device, and the second device includes one of a target base station and a second terminal device.

Figure 4:
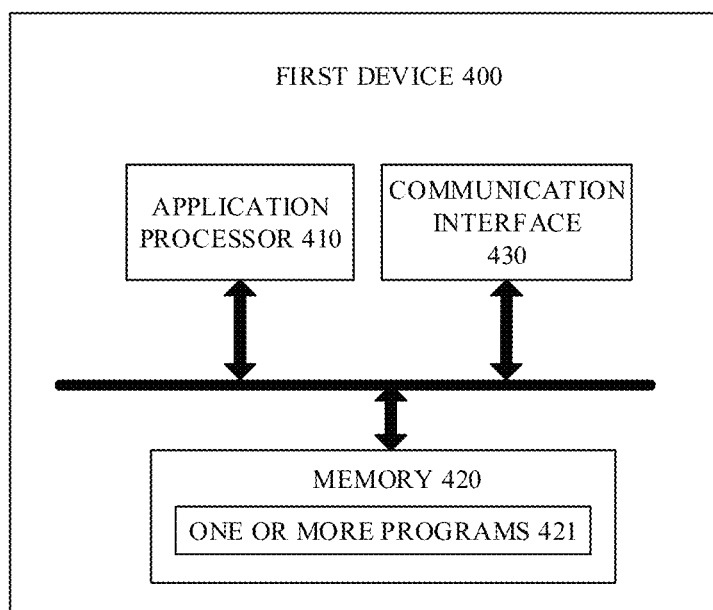
FIG. 4 is a schematic structural diagram of a first device provided in implementations of the present disclosure.

Referring to FIG. 4, FIG. 4 is a schematic structural diagram of a first device 400 provided in implementations of the present application. As illustrated in FIG. 4, the first device 400 includes a processor 410, a memory 420 configured to store one or more programs 421, and a communication interface 430. The one or more programs 421 are configured to be executed by the processor 410 and include instructions configured to perform the following.

A handover command is transmitted to a terminal device, where the handover command indicates that the terminal device hands over from the first device currently accessed to a second device, and the handover command is used to be received by the terminal device to obtain and determine time synchronization information of the second device.

It can be seen that, in implementations of the present application, the first device transmits the handover command to the terminal device, where the handover command indicates that the terminal device hands over from the first device currently accessed to the second device, and the handover command is used to be received by the terminal device to obtain and determine the time synchronization information of the second device. It can be seen that, the first device transmits the handover command to the terminal device when the terminal device is moving, so that when receiving the handover command to access the second device, the terminal device obtains the time synchronization information of the second device in time, so as to ensure that after the terminal device accesses the second device, the time synchronization with the second device is met, thereby ensuring accuracy of data transmission.

In a possible example, the time synchronization information includes at least one of: synchronization time of the second device, time synchronization accuracy of the second device, and propagation delay compensation information.

In a possible example, the time synchronization information is used for the terminal device to perform time synchronization with the second device according to the time synchronization information.

In a possible example, the time synchronization information includes synchronization time of the second device, the synchronization time of the second device indicates clock information of the second device, and the clock information of the second device is used for the terminal device to perform time synchronization with the second device.

In a possible example, the synchronization time of the second device includes: a reference SFN, uncertainty, time corresponding to the SFN, and a TSC clock domain.

In a possible example, the time synchronization information includes time synchronization accuracy of the second device, and in terms of performing the time synchronization with the second device according to the time synchronization information by the terminal device, the time synchronization accuracy of the second device is used for the terminal device to determine whether the time synchronization accuracy meets a preset threshold, and perform the time synchronization with the second device based on a determination that the time synchronization accuracy meets the preset threshold.

In a possible example, the time synchronization information includes propagation delay compensation information, and the propagation delay compensation information is used for the terminal device to determine a propagation delay compensation state with the second device.

In a possible example, the propagation delay compensation information includes propagation delay compensation indication information, and in terms of determining the propagation delay compensation state with the second device by the terminal device, the propagation delay compensation indication information is used for the terminal device to determine whether the second device has performed propagation delay compensation and whether the terminal device performs propagation delay compensation.

In a possible example, the propagation delay compensation information includes a propagation delay compensation condition, and in terms of determining the propagation delay compensation state with the second device by the terminal device, the propagation delay compensation condition is used for the terminal device to determine the propagation delay compensation condition for propagation delay compensation and a valid duration of the propagation delay compensation.

In a possible example, the propagation delay compensation information includes a compensation value and/or a compensation value list for propagation delay compensation by the terminal device, and the compensation value and/or the compensation value list for propagation delay compensation by the terminal device is used for the terminal device to perform propagation delay compensation according to the compensation value or the compensation value list.

In a possible example, the propagation delay compensation information does not include a compensation value and/or a compensation value list for propagation delay compensation by the terminal device, and the terminal device performs propagation delay compensation according to a preconfigured TA or a preset compensation value.

In a possible example, the one or more programs 421 further include instructions configured to perform the following. The time synchronization information of the second device is obtained, where the first device includes one of a source base station and a first terminal device, and the second device includes one of a target base station and a second terminal device.

In a possible example, in terms of obtaining the time synchronization information of the second device, the instructions in the one or more programs 421 are specifically configured to perform the following. The time synchronization information of the second device is obtained from a preset type of network device.

In a possible example, in terms of obtaining the time synchronization information of the second device, the instructions in the one or more programs 421 are specifically configured to perform the following. The time synchronization information is obtained from an ACK message transmitted by the second device, where the ACK message is a feedback message of the second device for a handover request message of the first device.

In a possible example, the one or more programs 421 further include instructions configured to perform the following. A dedicated RRC message is transmitted to the terminal device, where the dedicated RRC message is used for the terminal device to obtain the time synchronization information contained in the dedicated RRC message.

In a possible example, the time synchronization information is contained in the handover command, and the terminal device obtains the time synchronization information from the handover command.

Figure 5:
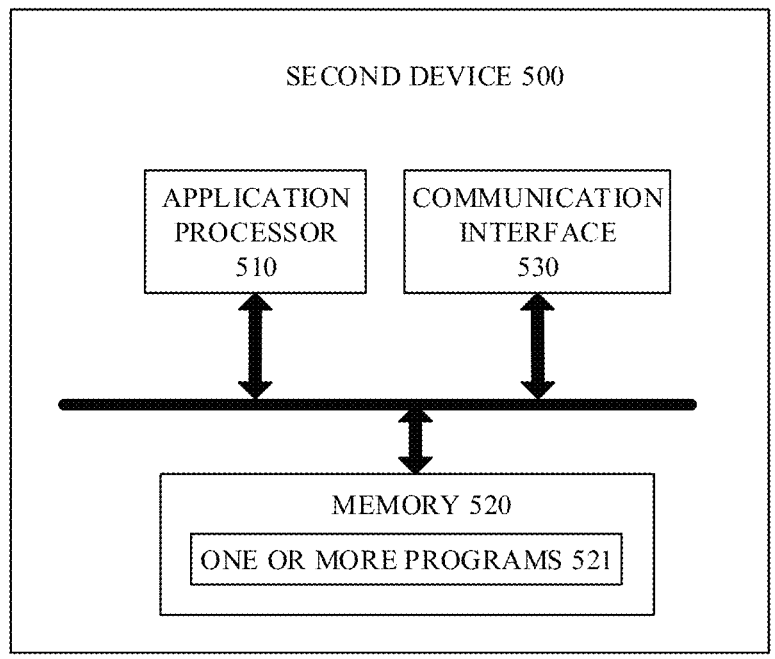
FIG. 5 is a schematic structural diagram of a second device provided in implementations of the present disclosure.

Referring to FIG. 5, FIG. 5 is a schematic structural diagram of a second device 500 provided in implementations of the present application. As illustrated in FIG. 5, the second device 500 includes a processor 510, a memory 520 configured to store one or more programs 521, and a communication interface 530. The one or more programs 521 are configured to be executed by the processor 510 and include instructions configured to perform the following.

A handover request message transmitted from a first device is received. An ACK message for the handover request message is transmitted to the first device, where the ACK message is used for the first device to transmit a handover command to a terminal device according to the ACK message, the first device is a device currently accessed by the device, the handover command indicates that the terminal device hands over from the first device to the second device, and the handover command is used to be received by the terminal device to obtain and determine time synchronization information of the second device.

It can be seen that, in implementations of the present application, the second device receives the handover request message transmitted from the first device, and transmits the ACK message for the handover request message to the first device, where the ACK message is used for the first device to transmit the handover command to the terminal device according to the ACK message, the first device is the device currently accessed by the terminal device, the handover command indicates that the terminal device hands over from the first device to the second device, and the handover command is used to be received by the terminal device to obtain and determine the time synchronization information of the second device. It can be seen that, the first device requests the second device for handover when the terminal device is moving, the second device allows the terminal device to access, and then feeds back an ACK message to the first device. Then, the first device transmits the handover command to the terminal device according to the ACK message to indicate that the terminal device accesses the second device. At this time, the terminal device obtains the time synchronization information of the second device in time, so as to ensure that after the terminal device accesses the second device, the time synchronization with the second device is met, thereby ensuring accuracy of data transmission.

In a possible example, the time synchronization information includes at least one of: synchronization time of the second device, time synchronization accuracy of the second device, and propagation delay compensation information.

In a possible example, the time synchronization information is used for the terminal device to perform time synchronization with the second device according to the time synchronization information.

In a possible example, the time synchronization information includes synchronization time of the second device, the synchronization time of the second device indicates clock information of the second device, and the clock information of the second device is used for the terminal device to perform time synchronization with the second device.

In a possible example, the synchronization time of the second device includes: a reference SFN, uncertainty, time corresponding to the SFN, and a TSC clock domain.

In a possible example, the time synchronization information includes time synchronization accuracy of the second device, and in terms of performing the time synchronization with the second device according to the time synchronization information by the terminal device, the time synchronization accuracy is used for the terminal device to determine whether the time synchronization accuracy meets a preset threshold, and perform the time synchronization with the second device based on a determination that the time synchronization accuracy meets the preset threshold.

In a possible example, the time synchronization information includes propagation delay compensation information, and the propagation delay compensation information is used for the terminal device to determine a propagation delay compensation state with the second device.

In a possible example, the propagation delay compensation information includes propagation delay compensation indication information, and in terms of determining the propagation delay compensation state with the second device by the terminal device, the propagation delay compensation indication information is used for the terminal device to determine whether the second device has performed propagation delay compensation and whether the terminal device performs propagation delay compensation.

In a possible example, the propagation delay compensation information includes a propagation delay compensation condition, and in terms of determining the propagation delay compensation state with the second device by the terminal device, the propagation delay compensation condition is used for the terminal device to determine the propagation delay compensation condition for propagation delay compensation and a valid duration of the propagation delay compensation.

In a possible example, the propagation delay compensation information includes a compensation value and/or a compensation value list for propagation delay compensation by the terminal device, and the compensation value and/or the compensation value list for propagation delay compensation by the terminal device is used for the terminal device to perform propagation delay compensation according to the compensation value or the compensation value list.

In a possible example, the propagation delay compensation information does not include a compensation value and/or a compensation value list for propagation delay compensation by the terminal device, and the terminal device performs propagation delay compensation according to a preconfigured TA or a preset compensation value.

In a possible example, the one or more programs 521 further include instructions configured to perform the following. The time synchronization information is transmitted to the first device, where the first device includes one of a source base station and a first terminal device, and the second device includes one of a target base station and a second terminal device.

In a possible example, in terms of transmitting the time synchronization information to the first device, the instructions in the one or more programs 521 are specifically configured to perform the following. The second device transmits the time synchronization information to the first device through a preset type of network device.

In a possible example, the time synchronization information is contained in the ACK message, and the second device transmits the time synchronization information to the first device through the ACK message.

In a possible example, the time synchronization information is used to be transmitted by the first device to the terminal device through a dedicated RRC message.

In a possible example, the time synchronization information is used to be transmitted by the first device to the terminal device through the handover command.

Technical solutions of implementations of the present application have been elaborated above from the perspective of interaction between various network elements. It can be understood that, in order to implement the above functions, the network device include hardware structures and/or software modules for performing respective functions. Those of ordinary skill in the art will appreciate that units and algorithmic operations of various examples described in connection with implementations of the disclosure can be implemented by hardware or by a combination of hardware and computer software. Whether these functions are performed by means of hardware or hardware driven by computer software depends on the particular application and the design constraints of the associated technical solution. Those skilled in the art may use different methods with regard to each particular application to implement the described functionality, but such methods should not be regarded as lying beyond the scope of the disclosure.

Division of functional units of the terminal device may be implemented according to the above method implementations in implementations of the present application. For example, various functional units may be divided to be in one-to-one correspondence with each function, or two or more functions may be integrated into one processing unit. The integrated unit may be implemented in the form of hardware, or may be implemented in the form of software program module. It is to be noted that, division of units in implementations of the disclosure is illustrative and is only a division of logical functions, and there may exist other manners of division in practice.

Figure 6:
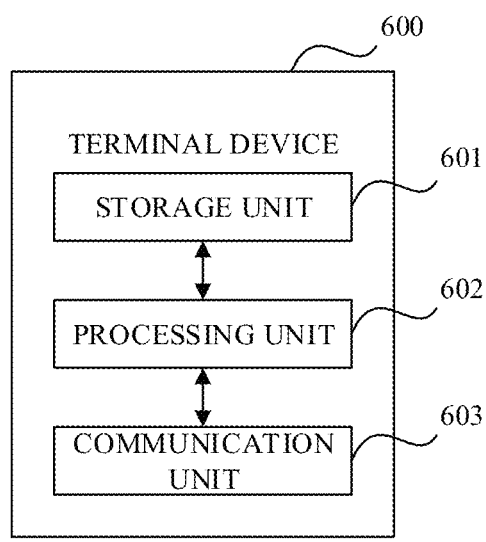
FIG. 6 is a block diagram of functional units of a terminal device provided in implementations of the present disclosure.

In the case of using the integrated unit, FIG. 6 illustrates a block diagram of possible functional units of the terminal device involved in the above implementations. The terminal device 600 includes a processing unit 602 and a communication unit 603. The processing unit 602 is configured to control and manage operations of the terminal device. For example, the processing unit 602 is configured to support the terminal device to perform S205 illustrated in FIG. 2 and/or other processes in the technical solutions described herein. The communication unit 603 is configured to support communication between the terminal device and other devices, for example, communication with the first device illustrated in FIG. 4 or communication with the second device illustrated in FIG. 5. The terminal device may further include a storage unit 601 configured to store program codes and data of the terminal device.

The processing unit 602 may be a processor or a controller and may be, for example, a central processing unit (CPU), a general-purpose processor, a digital signal processor (DSP), an application-specific integrated circuit (ASIC), a field programmable gate array (FPGA), or other programmable logic devices, transistor logic devices, hardware components, or a combination thereof. Various exemplary logic blocks, modules, and circuits disclosed in implementations of the present disclosure can be implemented or executed. The processor may also be a combination for implementing computing functions, for example, one or more microprocessors, a combination of DSP and microprocessor, or the like. The communicating unit 603 may be a communication interface, a transceiver circuit, etc. The storage unit 601 may be a memory. When the processing unit 602 is a processor, the communication unit 603 is a communication interface, and the storage unit 601 is a memory, the terminal device involved in implementations of the present application may be the terminal device illustrated in FIG. 3.

In specific implementation, the processing unit 602 is configured to perform any operation performed by the terminal device in above method implementations, and when data transmission such as receiving is performed, the communication unit 603 may be selectively invoked to complete corresponding operations, which will be described in detail below.

The communication unit 603 is configured to receive a handover command from a first device, where the first device is a device currently accessed by the terminal device, and the handover command indicates that the terminal device hands over from the first device to a second device.

The processing unit 602 is configured to obtain and determine time synchronization information of the second device.

It can be seen that, in implementations of the present disclosure, the terminal device receives the handover command from the first device, where the first device is the device currently accessed by the terminal device, and the handover command indicates that the terminal device hands over from the first device to the second device, and obtains and determines the time synchronization information of the second device. It can be seen that, when receiving, during moving, the handover command to access the second device, the terminal device obtains the time synchronization information of the second device in time, so as to ensure that after the terminal device accesses the second device, the time synchronization with the second device is met, thereby ensuring accuracy of data transmission.

In a possible example, the time synchronization information includes at least one of: synchronization time of the second device, time synchronization accuracy of the second device, and propagation delay compensation information.

In a possible example, the processing unit 602 is further configured to: perform time synchronization with the second device according to the time synchronization information, after obtaining and determining the time synchronization information of the second device.

In a possible example, the time synchronization information includes synchronization time of the second device, and the processing unit 602 is further configured to: determine clock information of the second device according to the synchronization time of the second device, where the clock information of the second device is used for time synchronization with the second device.

In a possible example, the synchronization time of the second device includes: a reference SFN, uncertainty, time corresponding to the SFN, and a TSC clock domain.

In a possible example, the time synchronization information includes time synchronization accuracy of the second device, and in terms of performing the time synchronization with the second device according to the time synchronization information, the processing unit 602 is specifically configured to: determine whether the time synchronization accuracy of the second device meets a preset threshold, and perform the time synchronization with the second device based on a determination that the time synchronization accuracy of the second device meets the preset threshold.

In a possible example, the time synchronization information includes propagation delay compensation information, and the processing unit 602 is further configured to: determine a propagation delay compensation state with the second device according to the propagation delay compensation information.

In a possible example, the propagation delay compensation information includes propagation delay compensation indication information, and in terms of determining the propagation delay compensation state with the second device according to the propagation delay compensation information, the processing unit 602 is specifically configured to: determine whether the second device has performed propagation delay compensation and whether the terminal device performs propagation delay compensation, according to the propagation delay compensation indication information.

In a possible example, the propagation delay compensation information includes a propagation delay compensation condition, and in terms of determining the propagation delay compensation state with the second device according to the propagation delay compensation information, the processing unit 602 is specifically configured to: determine the propagation delay compensation condition for propagation delay compensation and a valid duration of the propagation delay compensation, according to the propagation delay compensation condition.

In a possible example, the propagation delay compensation information includes a compensation value and/or a compensation value list for propagation delay compensation by the terminal device, and the compensation value and/or the compensation value list for propagation delay compensation by the terminal device is used for the terminal device to perform propagation delay compensation according to the compensation value or the compensation value list.

In a possible example, the propagation delay compensation information does not include a compensation value and/or a compensation value list for propagation delay compensation by the terminal device, and the processing unit 602 is further configured to: perform propagation delay compensation according to a preconfigured TA or a preset compensation value.

In a possible example, in terms of obtaining and determining the time synchronization information of the second device, the processing unit 602 is specifically configured to: obtain and determine the time synchronization information of the second device through a dedicated RRC message transmitted by the first device.

In a possible example, in terms of obtaining and determining the time synchronization information of the second device through the dedicated RRC message transmitted by the first device, the processing unit 602 is specifically configured to: obtain the time synchronization information of the second device carried in the handover command from the first device, and determine the time synchronization information.

In a possible example, the time synchronization information is time synchronization information carried in an ACK message transmitted by the second device to the first device, and the ACK message is a feedback message of the second device for a handover request message of the first device.

In a possible example, in terms of obtaining and determining the time synchronization information of the second device, the processing unit 602 is specifically configured to: read and determine system information of the second device in a process of performing handover according to the handover command, where the time synchronization information is contained in the system information.

In a possible example, in terms of reading and determining the system information of the second device in the process of performing handover according to the handover command, the processing unit 602 is specifically configured to: read and determine the system information of the second device at a first moment, where the first moment includes any one of: when the handover command is received, in the process of performing handover according to the handover command, when part of the time synchronization information is obtained, before an random access procedure for the second device, during the random access procedure for the second device, when the random access procedure succeeds, when the handover is completed, when an RRC reconfiguration complete message is transmitted to the second device, and when an indication to read the system information of the second device is received.

In a possible example, the first device includes one of a source base station and a first terminal device, and the second device includes one of a target base station and a second terminal device.

Figure 7:
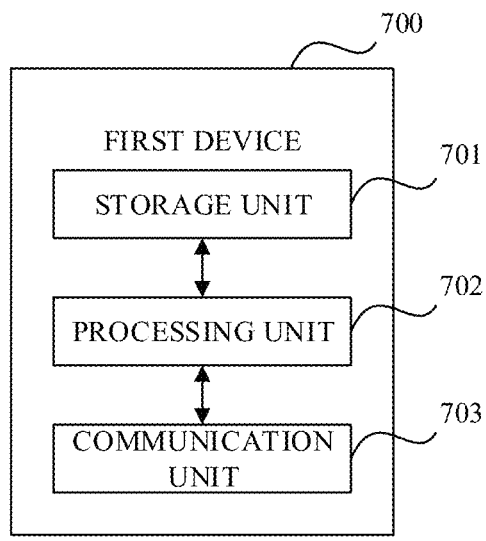
FIG. 7 is a block diagram of functional units of a first device provided in implementations of the present disclosure.

In the case of using the integrated unit, FIG. 7 illustrates a block diagram of possible functional units of the first device involved in the above implementations. The first device 700 includes a communication unit 703. The first device 700 further includes a processing unit 702. The processing unit 702 is configured to control and manage operations of the first device. The communication unit 703 is configured to support communication between the first device and other devices, for example, communication with the terminal device illustrated in FIG. 3. The first device may further include a storage unit 701 configured to store program codes and data of the first device.

The processing unit 702 may be a processor or a controller and may be, for example, a CPU, a general-purpose processor, a DSP, an ASIC, a FPGA, or other programmable logic devices, transistor logic devices, hardware components, or a combination thereof. Various exemplary logic blocks, modules, and circuits disclosed in implementations of the present disclosure can be implemented or executed. The processor may also be a combination for implementing computing functions, for example, one or more microprocessors, a combination of DSP and microprocessor, or the like. The communication unit 703 may be a communication interface, a transceiver circuit, etc. The storage unit 701 may be a memory. When the processing unit 702 is a processor, the communication unit 703 is a communication interface, and the storage unit 701 is a memory, the first device involved in implementations of the present application may be the first device illustrated in FIG. 4.

In specific implementation, the processing unit 702 is configured to perform any operation performed by the first device in above method implementations, and when data transmission such as transmitting is performed, the communication unit 703 may be selectively invoked to complete corresponding operations, which will be described in detail below.

The communication unit 703 is configured to: transmit a handover command to a terminal device, where the handover command indicates that the terminal device hands over from the first device currently accessed to a second device, and the handover command is used to be received by the terminal device to obtain and determine time synchronization information of the second device.

It can be seen that, in implementations of the present application, the first device transmits the handover command to the terminal device, where the handover command indicates that the terminal device hands over from the first device currently accessed to the second device, and the handover command is used to be received by the terminal device to obtain and determine the time synchronization information of the second device. It can be seen that, the first device transmits the handover command to the terminal device when the terminal device is moving, so that when receiving the handover command to access the second device, the terminal device obtains the time synchronization information of the second device in time, so as to ensure that after the terminal device accesses the second device, the time synchronization with the second device is met, thereby ensuring accuracy of data transmission.

In a possible example, the time synchronization information includes at least one of: synchronization time of the second device, time synchronization accuracy of the second device, and propagation delay compensation information.

In a possible example, the time synchronization information is used for the terminal device to perform time synchronization with the second device according to the time synchronization information.

In a possible example, the time synchronization information includes synchronization time of the second device, the synchronization time of the second device indicates clock information of the second device, and the clock information of the second device is used for the terminal device to perform time synchronization with the second device.

In a possible example, the synchronization time of the second device includes: a reference SFN, uncertainty, time corresponding to the SFN, and a TSC clock domain.

In a possible example, the time synchronization information includes time synchronization accuracy of the second device, and in terms of performing the time synchronization with the second device according to the time synchronization information by the terminal device, the time synchronization accuracy of the second device is used for the terminal device to determine whether the time synchronization accuracy meets a preset threshold, and perform the time synchronization with the second device based on a determination that the time synchronization accuracy meets the preset threshold.

In a possible example, the time synchronization information includes propagation delay compensation information, and the propagation delay compensation information is used for the terminal device to determine a propagation delay compensation state with the second device.

In a possible example, the propagation delay compensation information includes propagation delay compensation indication information, and in terms of determining the propagation delay compensation state with the second device by the terminal device, the propagation delay compensation indication information is used for the terminal device to determine whether the second device has performed propagation delay compensation and whether the terminal device performs propagation delay compensation.

In a possible example, the propagation delay compensation information includes a propagation delay compensation condition, and in terms of determining the propagation delay compensation state with the second device by the terminal device, the propagation delay compensation condition is used for the terminal device to determine the propagation delay compensation condition for propagation delay compensation and a valid duration of the propagation delay compensation.

In a possible example, the propagation delay compensation information includes a compensation value and/or a compensation value list for propagation delay compensation by the terminal device, and the compensation value and/or the compensation value list for propagation delay compensation by the terminal device is used for the terminal device to perform propagation delay compensation according to the compensation value or the compensation value list.

In a possible example, the propagation delay compensation information does not include a compensation value and/or a compensation value list for propagation delay compensation by the terminal device, and the terminal device performs propagation delay compensation according to a preconfigured TA or a preset compensation value.

In a possible example, the communication unit 703 is further configured to: obtain the time synchronization information of the second device, where the first device includes one of a source base station and a first terminal device, and the second device includes one of a target base station and a second terminal device.

In a possible example, in terms of obtaining the time synchronization information of the second device, the communication unit 703 is specifically configured to: obtain the time synchronization information of the second device from a preset type of network device.

In a possible example, in terms of obtaining the time synchronization information of the second device, the communication unit 703 is specifically configured to: obtain the time synchronization information from an ACK message transmitted by the second device information, where the ACK message is a feedback message of the second device for a handover request message of the first device.

In a possible example, the communication unit 703 is further configured to: transmit a dedicated RRC message to the terminal device, where the dedicated RRC message is used for the terminal device to obtain the time synchronization information contained in the dedicated RRC message.

In a possible example, the time synchronization information is contained in the handover command, and the terminal device obtains the time synchronization information from the handover command.

Figure 8:
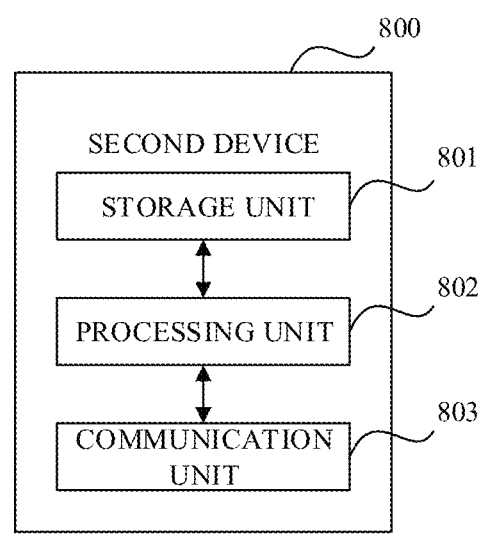
FIG. 8 is a block diagram of functional units of a second device provided in implementations of the present disclosure.

In the case of using the integrated unit, FIG. 8 illustrates a block diagram of possible functional units of the second device involved in the above implementations. The second device 800 includes a communication unit 803. The second device 800 further includes a processing unit 802. The processing unit 802 is configured to control and manage operations of the second device. The communication unit 803 is configured to support communication between the second device and other devices, for example, communication with the terminal device illustrated in FIG. 3. The second device may further include a storage unit 801 configured to store program codes and data of the second device.

The processing unit 802 may be a processor or a controller and may be, for example, a CPU, a general-purpose processor, a DSP, an ASIC, a FPGA, or other programmable logic devices, transistor logic devices, hardware components, or a combination thereof. Various exemplary logic blocks, modules, and circuits disclosed in implementations of the present disclosure can be implemented or executed. The processor may also be a combination for implementing computing functions, for example, one or more microprocessors, a combination of DSP and microprocessor, or the like. The communication unit 803 may be a communication interface, a transceiver circuit, etc. The storage unit 801 may be a memory. When the processing unit 802 is a processor, the communication unit 803 is a communication interface, and the storage unit 801 is a memory, the second device involved in implementations of the present application may be the second device illustrated in FIG. 5.

In specific implementation, the processing unit 802 is configured to perform any operation performed by the second device in above method implementations, and when data transmission such as transmitting is performed, the communication unit 803 may be selectively invoked to complete corresponding operations, which will be described in detail below.

The communication unit 803 is configured to receive a handover request message transmitted from a first device, and transmit an ACK message for the handover request message to the first device, where the ACK message is used for the first device to transmit a handover command to a terminal device according to the ACK message, the first device is a device currently accessed by the terminal device, the handover command indicates that the terminal device hands over from the first device to the second device, and the handover command is used to be received by the terminal device to obtain and determine time synchronization information of the second device.

It can be seen that, in implementations of the present application, the second device receives the handover request message transmitted from the first device, and transmits the ACK message for the handover request message to the first device, where the ACK message is used for the first device to transmit the handover command to the terminal device according to the ACK message, the first device is the device currently accessed by the terminal device, the handover command indicates that the terminal device hands over from the first device to the second device, and the handover command is used to be received by the terminal device to obtain and determine the time synchronization information of the second device. It can be seen that, the first device requests the second device for handover when the terminal device is moving, the second device allows the terminal device to access, and then feeds back an ACK message to the first device. Then, the first device transmits the handover command to the terminal device according to the ACK message to indicate that the terminal device accesses the second device. At this time, the terminal device obtains the time synchronization information of the second device in time, so as to ensure that after the terminal device accesses the second device, the time synchronization with the second device is met, thereby ensuring accuracy of data transmission.

In a possible example, the time synchronization information includes at least one of: synchronization time of the second device, time synchronization accuracy of the second device, and propagation delay compensation information.

In a possible example, the time synchronization information is used for the terminal device to perform time synchronization with the second device according to the time synchronization information.

In a possible example, the time synchronization information includes synchronization time of the second device, the synchronization time of the second device indicates clock information of the second device, and the clock information of the second device is used for the terminal device to perform time synchronization with the second device.

In a possible example, the synchronization time of the second device includes: a reference SFN, uncertainty, time corresponding to the SFN, and a TSC clock domain.

In a possible example, the time synchronization information includes time synchronization accuracy of the second device, and in terms of performing the time synchronization with the second device according to the time synchronization information by the terminal device, the time synchronization accuracy of the second device is used for the terminal device to determine whether the time synchronization accuracy meets a preset threshold, and perform the time synchronization with the second device based on a determination that the time synchronization accuracy meets the preset threshold.

In a possible example, the time synchronization information includes propagation delay compensation information, and the propagation delay compensation information is used for the terminal device to determine a propagation delay compensation state with the second device.

In a possible example, the propagation delay compensation information includes propagation delay compensation indication information, and in terms of determining the propagation delay compensation state with the second device by the terminal device, the propagation delay compensation indication information is used for the terminal device to determine whether the second device has performed propagation delay compensation and whether the terminal device performs propagation delay compensation.

In a possible example, the propagation delay compensation information includes a propagation delay compensation condition, and in terms of determining the propagation delay compensation state with the second device by the terminal device, the propagation delay compensation condition is used for the terminal device to determine the propagation delay compensation condition for propagation delay compensation and a valid duration of the propagation delay compensation.

In a possible example, the propagation delay compensation information includes a compensation value and/or a compensation value list for propagation delay compensation by the terminal device, and the compensation value and/or the compensation value list for propagation delay compensation by the terminal device is used for the terminal device to perform propagation delay compensation according to the compensation value or the compensation value list.

In a possible example, the propagation delay compensation information does not include a compensation value and/or a compensation value list for propagation delay compensation by the terminal device, and the terminal device performs propagation delay compensation according to a preconfigured TA or a preset compensation value.

In a possible example, the communication unit 803 is further configured to: transmit the time synchronization information to the first device, where the first device includes one of a source base station and a first terminal device, and the second device includes one of a target base station and a second terminal device.

In a possible example, in terms of transmitting the time synchronization information to the first device, the communication unit 803 is specifically configured to: transmit the time synchronization information to the first device through a preset type of network device.

In a possible example, the time synchronization information is contained in the ACK message, and the second device transmits the time synchronization information to the first device through the ACK message.

In a possible example, the time synchronization information is used to be transmitted by the first device to the terminal device through a dedicated RRC message.

In a possible example, the time synchronization information is used to be transmitted by the first device to the terminal device through the handover command.

A chip is further provided in implementations of the present application. The chip includes a processor configured to invoke and execute computer programs stored in a memory, to cause a device equipped with the chip to perform some or all of the operations described for the terminal device in above method implementations.

A chip is further provided in implementations of the present application. The chip includes a processor configured to invoke and execute computer programs stored in a memory, to cause a device equipped with the chip to perform some or all of the operations described for the first device in above method implementations.

A chip is further provided in implementations of the present application. The chip includes a processor configured to invoke and execute computer programs stored in a memory, to cause a device equipped with the chip to perform some or all of the operations described for the second device in above method implementations.

A computer-readable storage medium is further provided in implementations of the present application. The computer-readable storage medium is configured to store computer programs for electronic data interchange. The computer programs are operable with a computer to perform some or all of the operations described for the terminal device in above method implementations.

A computer-readable storage medium is further provided in implementations of the present application. The computer-readable storage medium is configured to store computer programs for electronic data interchange. The computer programs are operable with a computer to perform some or all of the operations described for the first device in above method implementations.

A computer-readable storage medium is further provided in implementations of the present application. The computer-readable storage medium is configured to store computer programs for electronic data interchange. The computer programs are operable with a computer to perform some or all of the operations described for the second device in above method implementations.

A computer program product is further provided in implementations of the present application. The computer program product includes computer programs. The computer programs are operable with a computer to perform some or all of the operations described for the terminal device in above method implementations. The computer program product may be a software installation package.

A computer program product is further provided in implementations of the present application. The computer program product includes computer programs. The computer programs are operable with a computer to perform some or all of the operations described for the first device in above method implementations. The computer program product may be a software installation package.

A computer program product is further provided in implementations of the present application. The computer program product includes computer programs. The computer programs are operable with a computer to perform some or all of the operations described for the second device in above method implementations. The computer program product may be a software installation package.

The steps of the method or algorithm described in implementations of the present application may be implemented by means of hardware, or may be implemented by executing software instructions by a processor. The software instructions can be implemented by corresponding software modules, which can be stored in a random access memory (RAM), a flash memory, a read only memory (ROM), an erasable programmable ROM (EPROM), an electrically EPROM (EEPROM), registers, hard disk, mobile hard disk, compact disc (CD)-ROM, or any other form of storage medium known in the art. An exemplary storage medium is coupled to the processor, such that the processor can read information from the storage medium and write information to the storage medium. The storage medium can also be a component of the processor. The processor and the storage medium may be located in an ASIC. In addition, the ASIC can be located in an access network device, a target network device, or a core network device. Of course, the processor and the storage medium may also be present as discrete components in the access network device, the target network device, or the core network device.

Those skilled in the art will appreciate that, all or part of functions described in one or more of the foregoing implementations can be implemented through software, hardware, firmware, or any other combination thereof. When implemented by software, all or part of the functions can be implemented in the form of a computer program product. The computer program product includes one or more computer instructions. When the computer instructions are applied and executed on a computer, all or part of the operations or functions of the implementations of the disclosure are performed. The computer can be a general-purpose computer, a special-purpose computer, a computer network, or other programmable apparatuses. The computer instruction can be stored in a computer readable storage medium, or transmitted from one computer readable storage medium to another computer readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer readable storage medium can be any computer accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

The purposes, technical solutions, and beneficial effects of implementations of the present application are described in detail in detailed description. It should be understood that, the above only illustrates specific implementation manners of implementations of the present application, and is not intended for limiting the scope of implementations of the present application. Any modifications, equivalent replacements, improvements, and the like made on the basis of the technical solutions of implementations of the present application should fall within the scope of implementations of the present application.

What is claimed is:

1. A method for time synchronization determination, comprising:

receiving, by a terminal device, a handover command from a first device, the first device being a device currently accessed by the terminal device, and the handover command indicating that the terminal device hands over from the first device to a second device;

obtaining and determining, by the terminal device, time synchronization information of the second device, wherein the time synchronization information comprises one or more of: an indication of whether the terminal device performs propagation delay compensation, and an indication of whether the second device has performed propagation delay compensation; and determining, by the terminal device, whether to perform propagation delay compensation according to the indication of whether the terminal device performs propagation delay compensation, and/or determining, by the terminal device, whether the second device has performed propagation delay compensation and/or whether the terminal device needs to perform propagation delay compensation according to the indication of whether the second device has performed propagation delay compensation.

2. The method of claim 1, wherein the time synchronization information further comprises at least one of: synchronization time of the second device, and time synchronization accuracy of the second device.

3. The method of claim 1, further comprising:

after obtaining and determining, by the terminal device, the time synchronization information of the second device:

performing, by the terminal device, time synchronization with the second device according to the time synchronization information.

4. The method of claim 2, wherein the synchronization time of the second device comprises: a reference system frame number (SFN), uncertainty, time corresponding to the SFN, and a time sensitive communication (TSC) clock domain.

5. The method of claim 1, wherein obtaining and determining, by the terminal device, the time synchronization information of the second device comprises:

obtaining and determining, by the terminal device, the time synchronization information of the second device through a dedicated radio resource control (RRC) message transmitted by the first device.

6. The method of claim 5, wherein obtaining and determining, by the terminal device, the time synchronization information of the second device through the dedicated RRC message transmitted by the first device comprises:

obtaining, by the terminal device, the time synchronization information of the second device carried in the handover command from the first device; and determining, by the terminal device, the time synchronization information.

7. The method of claim 1, wherein obtaining and determining, by the terminal device, the time synchronization information of the second device comprises:

reading and determining, by the terminal device, system information of the second device in a process of performing handover according to the handover command, wherein the time synchronization information is contained in the system information.

8. The method of claim 7, wherein reading and determining, by the terminal device, the system information of the second device in the process of performing handover according to the handover command comprises:

reading and determining, by the terminal device, the system information of the second device at a first moment, wherein the first moment comprises any one of: when the handover command is received, in the process of performing handover according to the handover command, when part of the time synchronization information is obtained, before an random access procedure for the second device, during the random access procedure for the second device, when the random access procedure succeeds, when the handover is completed, when an RRC reconfiguration complete message is transmitted to the second device, and when an indication to read the system information of the second device is received.

9. A method for time synchronization determination, comprising:

transmitting, by a first device, a handover command to a terminal device, wherein the handover command indicates that the terminal device hands over from the first device currently accessed to a second device, and the handover command is used to be received by the terminal device to obtain and determine time synchronization information of the second device, the time synchronization information comprises one or more of: an indication of whether the terminal device performs propagation delay compensation, and an indication of whether the second device has performed propagation delay compensation, wherein the indication of whether the terminal device performs propagation delay compensation is used for the terminal device to determine whether to perform propagation delay compensation, and the indication of whether the second device has performed propagation delay compensation is used for the terminal device to determine whether the second device has performed propagation delay compensation and/or whether the terminal device needs to perform propagation delay compensation.

10. The method of claim 9, wherein the time synchronization information further comprises at least one of: synchronization time of the second device, and time synchronization accuracy of the second device.

11. The method of claim 9, wherein the time synchronization information is used for the terminal device to perform time synchronization with the second device according to the time synchronization information.

12. The method of claim 10, wherein the synchronization time of the second device comprises: a reference system frame number (SFN), uncertainty, time corresponding to the SFN, and a time sensitive communication (TSC) clock domain.

13. A method for time synchronization determination, comprising:

receiving, by a second device, a handover request message transmitted from a first device; and transmitting, by the second device, an acknowledgment (ACK) message for the handover request message to the first device, wherein the ACK message is used for the first device to transmit a handover command to a terminal device according to the ACK message, the first device is a device currently accessed by the terminal device, the handover command indicates that the terminal device hands over from the first device to the second device, the handover command is used to be received by the terminal device to obtain and determine time synchronization information of the second device, the time synchronization information comprises one or more of: an indication of whether the terminal device performs propagation delay compensation, and an indication of whether the second device has performed propagation delay compensation, wherein the indication of whether the terminal device performs propagation delay compensation is used for the terminal device to determine whether to perform propagation delay compensation, and the indication of whether the second device has performed propagation delay compensation is used for the terminal device to determine whether the second device has performed propagation delay compensation and/or whether the terminal device needs to perform propagation delay compensation.

14. The method of claim 13, wherein the time synchronization information further comprises at least one of: synchronization time of the second device, and time synchronization accuracy of the second device.

15. The method of claim 13, wherein the time synchronization information is used for the terminal device to perform time synchronization with the second device according to the time synchronization information.

16. A terminal device comprising:
a processor, a memory configured to store one or more programs, and a communication interface, the one or more programs being configured to be executed by the processor and comprising instructions configured to perform the method of claim 1.

17. A first device comprising:
a processor, a memory configured to store one or more programs, and a communication interface, the one or more programs being configured to be executed by the processor and comprising instructions configured to perform the method of claim 9.

18. A second device comprising:
a processor, a memory configured to store one or more programs, and a communication interface, the one or more programs being configured to be executed by the processor and comprising instructions configured to perform the method of claim 13.

* * * * *